United States Patent [19]

Herzog et al.

[11] Patent Number: 4,598,890
[45] Date of Patent: Jul. 8, 1986

[54] AVIONIC CONTROL SYSTEM

[75] Inventors: Hans K. Herzog, Bellevue; Seiya Sakurai, Seattle, both of Wash.

[73] Assignee: The Boeing Company, Seattle, Wash.

[21] Appl. No.: 519,288

[22] Filed: Aug. 1, 1983

[51] Int. Cl.⁴ .............................................. B64C 13/50
[52] U.S. Cl. ..................................... 244/230; 244/223
[58] Field of Search ...................... 244/223, 213, 75 R, 244/230, 236, 228, 221, 224, 227, 203

[56] References Cited

U.S. PATENT DOCUMENTS

| | | | |
|---|---|---|---|
| 2,423,959 | 7/1947 | Beman | 244/230 |
| 2,625,349 | 1/1953 | Speer | 244/230 |
| 2,652,995 | 9/1953 | Swain et al. | 244/236 |
| 2,796,774 | 6/1957 | Peed, Jr. | 244/230 |
| 2,974,908 | 3/1961 | Platt | 244/230 |
| 3,618,419 | 11/1971 | Maroshick | 244/230 |

Primary Examiner—Galen L. Barefoot
Attorney, Agent, or Firm—B. A. Donahue; H. Gus Hartmann

[57] ABSTRACT

An all-electric powered flight control system for an aircraft incorporating fault-tolerant avionics combined with a redundant power actuation control system utilizing electro-mechanical devices for actuating aerodynamic control surfaces; and wherein, the redundancy is implemented through the division of the total aerodynamic surface area to be actuated into multi-segments, with each control segment having its own channel in the avionic control system. The avionic control system is effective in minimizing the effects of power actuated control loads reacting through aircraft structure by the incorporation of an electronic gain control power module which is positioned between the power output side of an actuator (e.g., an electro-mechanical or electro-hydraulic device) and the aerodynamic control surface or segment being actuated. Further, the avionic control system includes means for passivating a single control segment of the multi-segmented aerodynamic control surface upon the malfunction of either its avionic control channel or its power actuator output.

4 Claims, 11 Drawing Figures

*Fig. 8* NORMAL MODE

*Fig. 9* FAILED MODE

*Fig. 10* TRIM MODE

AVIONIC CONTROL SYSTEM

TABLE OF ABBREVIATIONS

ADC—Air Data Computer
API—Actuator Performance Indicator
APU—Auxiliary Power Unit
DATAC—Digital Autonomous Terminal Access Communication (as described in U.S. Pat. No. 4,199,663 issued on Apr. 22, 1980 to H. K. Herzog)
GAAM—Gain Authority Adjust Motor
GCPM—Gain Control Power Module
MCU—Motor Control Unit
RACU—Remote Acquisition and Control Unit
PA—Power Actuator

BACKGROUND OF THE INVENTION

In order to achieve extremely high integrity and reliability in a fly-by-wire primary flight control system, the system should be designed in such a way that the operation of a large central computer is not necessary for basic control surface positioning, gain control and airplane stability augmentation functions; instead, each autonomous subsystem (e.g. force-control stick flight controller, rudder pedal assembly, spoiler actuator, elevator actuator, etc.) has its own small computer processing capability via a RACU (Remote Acquisition and Control Unit). The RACU exists in the primary flight control system for providing: data encoding/decoding, data transmitting/receiving, data acquisition, actuator control and redundancy management functions. If most of the special flight control system functions are computed and performed locally near the control surface, then computation time requirements of a large central computer would be greatly reduced. Also, in the utilization of power actuators at the aerodynamic control surface, there is a real problem in designing an actuator that will provide both adequate hinge moments and an adequate bandwidth, in so far as response characteristics of the aerodynamic control surface are concerned.

For large passenger-carrying commercial airplanes, there is a problem in the proper design and sizing of hydraulic power actuators for primary aerodynamic control surfaces, e.g., ailerons, rudders and elevators. The present approach to designing these actuators appears to be fundamentally wrong, because the piston diameter or effective area is sized for the maximum hinge moments to be encountered in both moving the primary aerodynamic control surface through an angular range and for producing a predetermined angle-of-deflection rate. In addition, the tubing or lines carrying pressurized hydraulic fluid and the control valves are sized to permit a maximum flow of pressurized hydraulic fluid in order to produce both the greatest hinge moment likely to be required and the predetermined maximum angle-of-deflection rate of the aerodynamic control surface. However, at slow flight speed of an airplane, i.e., during take-off or landing operations, both a large angle-of-deflection range and a high angle-of-deflection rate of aerodynamic control surface movement are required. But, at slow flight speed, there is less dynamic pressure acting on the aerodynamic control surface in comparison to high speed flight; therefore, the hinge moments at slow speed are relatively low. However, at high speed flight of an airplane, the dynamic pressure acting on a deflected aerodynamic control surface is near maximum; and the hinge moments and the resolution of angle-of-deflection rate requirements are also near maximum; whereas, the angle-of-deflection range is relatively small under this condition. Therefore, in designing for this high speed flight operation, the hydraulic power actuators produced are large and heavy. However, this would not necessarily have to be the case if there were a gain control device that could be inserted into the load path between the power actuator and its controlled aerodynamic surface. Prior studies of this problem have indicated that the result would be too complex a mechanical device for operating in the manner required.

With the advent of an all-electric flight control system for an airplane and the proposed utilization of an electro-mechanical or electro-hydraulic power actuator, there is a real design problem; because a key factor in the implementation of an all-electric flight control system for an airplane is the successful development of a suitable high-performance electric motor to replace the presently used hydraulic actuator. The electrical industry has had several practical breakthroughs in technology that make possible the development of an all-electric airplane. In the power-generation and actuation field, rare-earth-cobalt magnets, which are many times more powerful than the strongest Alnico magnets, are allowing the development of permanent-magnet generators and motors that are far superior to existing production components and provide unique opportunities not previously possible. Samarium-cobalt motors, gearboxes, and motor controllers are presently being developed for use on military airplanes and missiles.

SUMMARY OF THE INVENTION

The invention relates to an electronic flight control system for an aircraft and, more particularly, to a multi-data bus or a multi-channel redundancy fly-by-wire system with complete channel separation and no automatic switching of data or control information between the channels. The control system management philosophy is based on the redundant control system of an airplane being able to sustain a failure of any one segment of a multi-segmented control surface.

Further, in an electronic flight control system for an airplane, there is a significant possibility for an electro-hydraulic or electro-mechanical type of power actuator to freeze and/or produce a hard-over actuation of a control surface segment, and this could be disastrous during high speed flight. Therefore, in the event of such a failure, the rapid neutralization of the defective PA can convert an active failure which is either of the hard-over or oscillatory type into a passive and neutralized control surface segment failure. The loss of one PA and its respective control surface segment may leave the total multi-segmented control surface with a degraded operational capability; however, those PAs and their control surface segments which remain operational would be safely active. Also, by appropriately sizing the individual segments making up the total control surface, the flight control system can be adapted to tolerate a second PA failure, providing that it also can be quickly neutralized or rendered passive.

The present invention discloses a multi-segmented elevator control surface comprising: redundant electronic circuits and PAs providing an angle-of-deflection movement of their respective control surface segments, and wherein the redundancy is further implemented by each of the control surface segments having a gain control power module (GCPM) which incorporates means for passivating its control surface segment upon PA failure. The GCPM, in addition to being capable of passivating its control surface segment, is also effective in minimizing structural deflection and structural stress load effects from hard-over control inputs due to PA failure at high flight speed, and this is accomplished through the incorporation of a ratio-change mechanism which modulates the effective output movement of the PA. The ratio or the gain of a control surface segment angle-of-deflection range of movement relative to its PA range of travel can be adjusted by means of the ratio-change mechanism. For descriptive purposes only, it will be assumed that the highest value of gain obtainable by the GCPM is "one", and that this will result in the maximum range of angle-of-deflection travel of the control surface segment relative to its PA range of travel. Further, it will also be assumed that the lowest value of gain obtainable by the GCPM is "zero" and that this will result in a nulling or zero-deflection of the control surface segment relative to PA travel. Therefore, control authority of the PA over the control surface segment is limited by the GCPM between the gain adjustment positions of "zero" and "one".

In a redundant all-electric flight control system, electro-hydraulic and electro-mechanical power actuators have a finite probability of failure; therefore, an object is to passivate the actuation or active failure effects such as: hard-overs, oscillatory, jammed, jammed in a deflected position, and severed. Further, in order to render passive the failure effects of the PAs, an electronically redundant control circuit utilizing GCPMs are incorporated for producing the passive failure result.

Another object is to adjust the GCPM to suit variations in airspeed and for maintaining a predetermined, relatively constant, "control stick force per 'g' characteristic" over the entire flight regime of the airplane.

Another object is to increase control force stiffness and provide a finer control over control surface deflection with increasing flight speed, thereby helping to prevent control surface flutter at high airspeeds and limit cycling of the automatic flight controls at cruise flight speeds.

Another object is to convert a potentially hazardous failure in the flight control system into a passive failure with only a fraction of the total control surface area being neutralized.

Another object is to limit the authority of a power actuator by minimizing the deflection rate of an aerodynamic surface and minimizing the angular degree range of deflection as the flight speed increases in order to prevent structural damage during conditions of high dynamic pressure acting on the aerodynamic surface, such as the event of hard-over failure.

Another object is to automatically match the impedance of the control surface angle-of-deflection rate to the hinge force moments produced in relation to flight speed. This permits the use of lower powered actuators because a large angle-of-deflection range of movement of a control surface segment is not coincident with large hinge force moments. Further, this impedance matching eliminates the present known method of designing PAs which is to provide maximum torque at both the highest angle-of-deflection rate and through the greatest range of movement.

An advantage of an all-electric, redundant, flight control system is that it is much easier to run multiple electrical lines for damage control than it is to run multiple mechanical lines, which are also heavier.

Total electrical failure would be the only eventuality that could cause a complete failure of the redundant all-electronic control system. However, engine driven main generators generally have a back-up such as ram air driven generators and/or standby APU (Auxiliary Power Unit) driven generators; and the ultimate standby source is the aircraft's batteries.

DESCRIPTION OF THE PREFERRED EMBODIMENTS

Figure 1:
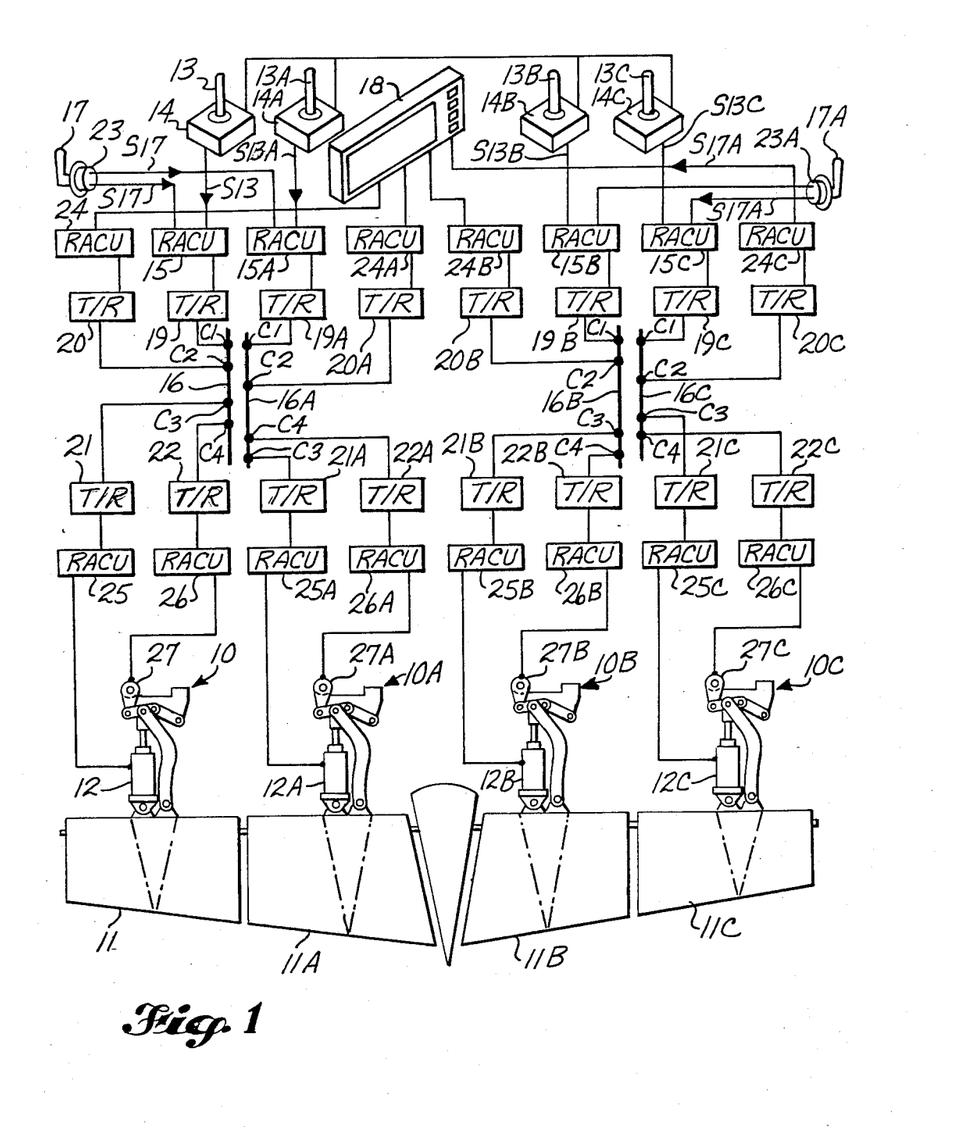
FIG. 1 is a schematic diagram of the all-electronic flight control system of the present invention incorporating a quad-redundant data bus system.

FIG. 1 is a schematic diagram of a fly-by-wire, quad-redundancy, data bus elevator control system which is a subsystem of an all-electric flight control system of an aircraft. The elevator control system is basically separated into two categories: (1) electronics, and (2) mechanics; and they become linked together through GCPMs (Gain Control Power Modules) 10-10C, located adjacent to each elevator control surface segment 11-11C, respectively.

In known conventional control systems for large, commercial, passenger-carrying airplanes, the pilot's and copilot's manual control input generally controls a servo valve of a main power output actuator unit or main actuator; and this main actuator is normally located at some distance from the aerodynamic surface being controllably actuated. A linkage or cable system generally provides the interconnection between the main actuator and the control surface; and the support mounting for the linkage or cable system, to fixed structure of the airplane, is designed and sized for accommodating the greatest or the maximum control loads to be encountered. An important aspect of the present invention is that a gain change by each GCPM 10-10C takes place in the main load path between a power actuator 12-12C and its respective aerodynamic surface segment 11-11C being controllably actuated.

If an airplane is being flown at high Mach number and the elevator control surface is inadvertently deflected at a rapid rate through an angle greater than it is structurally safe to do, then the resulting reaction load on the structurally fixed horizontal stabilizer could be excessive or the control surface could be ripped off with catastrophic consequences. In a known commercial airplane, such as the Boeing 727, there is a maximum permissible angle-of-deflection range for the elevator control surface which is approximately plus-or-minus 30 degrees. This range of movement of the elevator control surface would be safely permissible at low flight speed operation, such as for take-off or landing; however, at high flight speed operation or at maximum Mach number, the maximum allowable elevator movement may only be plus-or-minus 3° (three degrees) and this, at a predetermined degrees-per-second rate limit. Therefore, an important aspect of the present invention is an authority limitation on the angle-of-deflection range, coupled with a variation in the control force applied to each segment of an elevator control surface, and this is accomplished through the GCPMs 10-10C.

The pilot's and copilot's manual control input is initiated through two sets of dual wrist controllers (13, 13A) and (13B, 13C), respectively, which have both longitudinal and lateral angular movement and, through their respective wrist control stick position sensors or transducers 14-14C, generate a command signal S13-S13C, respectively, which is sent to RACUs (Remote Acquisition and Control Units) 15-15C, respectively. The wrist controllers 13-13C are used primarily for the command control signal input S13-S13C to the airplane's pitch and roll axis.

Wrist controllers 13-13C are compact input devices much less costly to manufacture than the control wheel and column combinations customarily installed in commercial transport airplanes. As in the case of the control wheel and column where the copilot's wheel and column follow the control-input motions made by the pilot, and vice versa, if only one wrist controller is deflected by one of the pilots, the other three will also be deflected, precisely following the motions of the controller actuated by the pilot. The means ensuring this ganging of the wrist controllers can be mechanical in nature, or in order to help preserve a large amount of cockpit real estate, can be an electromechanical servo system. One type of wrist controller device could basically comprise a positioning servo with a high degree of stiffness, which receives a deflection command signal that is obtained by algebraically summing output signals of force sensors attached to each of the wrist controllers; and the force sensors combined with signal conditioning circuits would be dualized for monitoring purposes.

Each individual wrist controller 13-13C, in combination with its position transducer 14-14C, respectively, generates an independent bipolar, longitudinal and lateral, command signal S13-S13C, thereby providing a quad-redundancy control input to a longitudinal primary flight control system which activates a quad-segmented elevator control surface 11-11C in the empennage section of the airplane. Data communication between the wrist controllers 13-13C, in the flight deck area, and the GCPMs 10-10C, at each of the elevator control surface segments 11-11C, respectively, flows through four redundant current-mode data buses 16-16C, respectively. Each of the four data buses 16-16C connects four data bus couplers C1-C4 which are associated with components as follows: C1 is associated with both pairs of wrist controllers 13-13C and pitot static probes 17-17A; C2 is associated with API (Actuator Performance Indicator) 18; C3 is associated with PAs 12-12C; and C4 is associated with GCPMs 10-10C. The four data bus couplers C1-C4 are attached to a data bus medium 16-16C by means of inductive couplers. The current-mode data bus 16-16C and the inductive data bus couplers C1-C4 are of the type described in U.S. Pat. No. 4,264,827 issued on Apr. 28, 1981 to H. K. Herzog. The data bus terminals T/R 19-19C, 20-20C, 21-21C, 22-22C, are of the autonomous access type and utilize DATAC (Digital Autonomous Terminal Access Communication) protocol as described in U.S. Pat. No. 4,199,663 issued on Apr. 22, 1980 to H. K. Herzog; and, as more fully described therein, recent development work on data bus terminal design has produced an effective terminal monitor which will prevent jamming of the data bus and alert the flight deck crew of the defective unit. For signal conditioning and data communication, the combined use of digital techniques and high-integrity data bus technology cuts the cost of the control-signalling system. Thus, performance is improved and an unprecedented level of redundancy is provided, thereby minimizing physical vulnerability and the probability of loss-of-function due to equipment failure. However, should the electronic data communication devices prove faulty or the PAs of the control surface segments malfunction, then a gain control authority adjustment will be made by the GCPMs to neutralize the fault.

Movement of the pilot's and copilot's pair of wrist controllers (13, 13A) and (13B, 13C) which are mechanically or electro-mechanically ganged, generates signals S13-S13C from the position transducers 14-14C, respectively, which reach the four GCPMs 10-10C via the four redundant data buses 16-16C. Each pair of wrist controllers (13, 13A) and (13B, 13C) feed a dualized command signal (S13-S13A) and (S13B-S13C), respectively, into RACUs 15-15C, which are, in essence, small data computers that house several circuit boards complete with connector and electrical heating/cooling provisions. Each of these RACUs 15-15C is also a pre-amplifier and pre-processor, containing signal-conditioning and power-conversion means. The RACUs 15-15C may vary in capacity and size in order to accommodate local data handling, computation, control and power amplification requirements.

The airspeed of the airplane is sensed by two pitot tubes 17, 17A having air data transducers 23, 23A, respectively, which are positioned one on each side of the airplane; and these are dedicated to provide dualized air data signals S17, S17A, respectively, which signals are fed into RACUs 15-15C. The air data signals S17, S17A from transducers 23, 23A, respectively, are accommodated by the same RACUs 15-15C as the wrist controller signals S13-S13C, as shown, or they may be accommodated by separate RACUs 24-24C.

The RACUs 15-15C output signals enter T/Rs 19-19C, respectively; and each T/R 19-19C output signal is put onto one of four data buses 16-16C through data bus coupler C1. As previously mentioned, data buses 16-16C are of the current-mode type utilizing induction bus couplers C1-C4 and described in U.S. Pat. No. 4,264,827 issued on Apr. 28, 1981 to H. K. Herzog.

Each of the T/Rs contains electronic firmware which is pre-programmed for each of the data bus couplers and sends out addresses to the local subsystem devices to fetch the data pieces. Also, contained within this electronic firmware is an information circuit which sends out a label to the data bus preceding the data to be transmitted so that, in essence, the data is identified by said label.

The RACUs 15-15C and T/Rs 19-19C output signals put onto data buses 16-16C enter two types of RACUs.

The first type of RACUs 25-25C, coupled with T/Rs 21-21C, respectively, have standard power conversion and data handling provisions and, in addition, contain position control circuits and power drive electronics for PAs 12-12C.

The second type of RACUs 26-26C, coupled with T/Rs 22-22C, respectively, also have standard power conversion and data handling provisions and, essentially, perform functions similar to the first type of RACUs and, in addition, contain position control circuits and power drive electronics for GAAM (Gain Authority Adjust Motors) 27-27C within the GCPMs 10-10C. Also, located within the second type, RACUs 26-26C, is a GCPM control circuitry which will accommodate the signal commands from the wrist controllers 13-13C and the air data signals S17, S17A and, in turn, relay the actual present position of each of the control surface segments 11-11C back to the data buses 16-16C for use by the pilot's and copilot's API 18; i.e., the resulting displacement of each of the control surface segments 11-11C is fed into API 18, which performs many important functions. First, in an integrated manner, it displays to the pilot and copilot the actual present position of each of the PAs 12-12C, together with their respective commanded or scheduled values. Second, a warning means will alert the pilot and copilot to any related discrepancy and also provide a detailed visual indication of the fault situation. Third, by special control means, such as buttons, levers or switches, the pilot and/or the copilot will be able to de-activate individual flight control surface segments 11-11C.

Figure 2A:
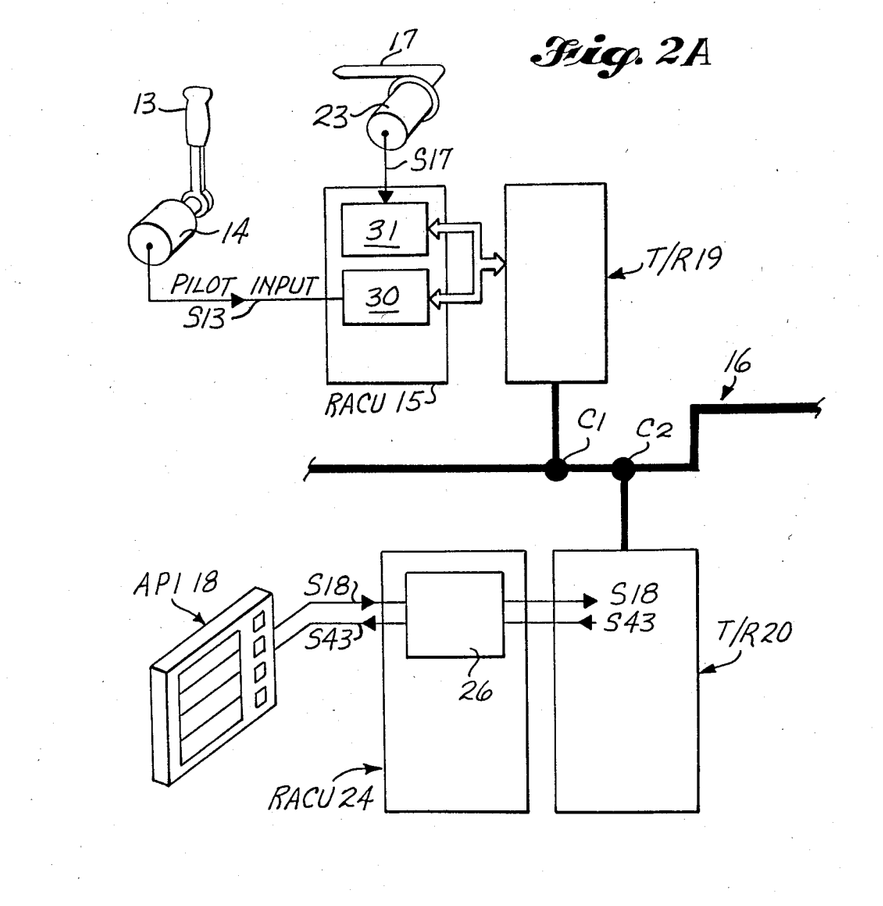
FIGS. 2A and 2B, combined, form a detailed block diagram of one data bus channel of the multi-data bus control system shown in FIG. 1.
Figure 2B:
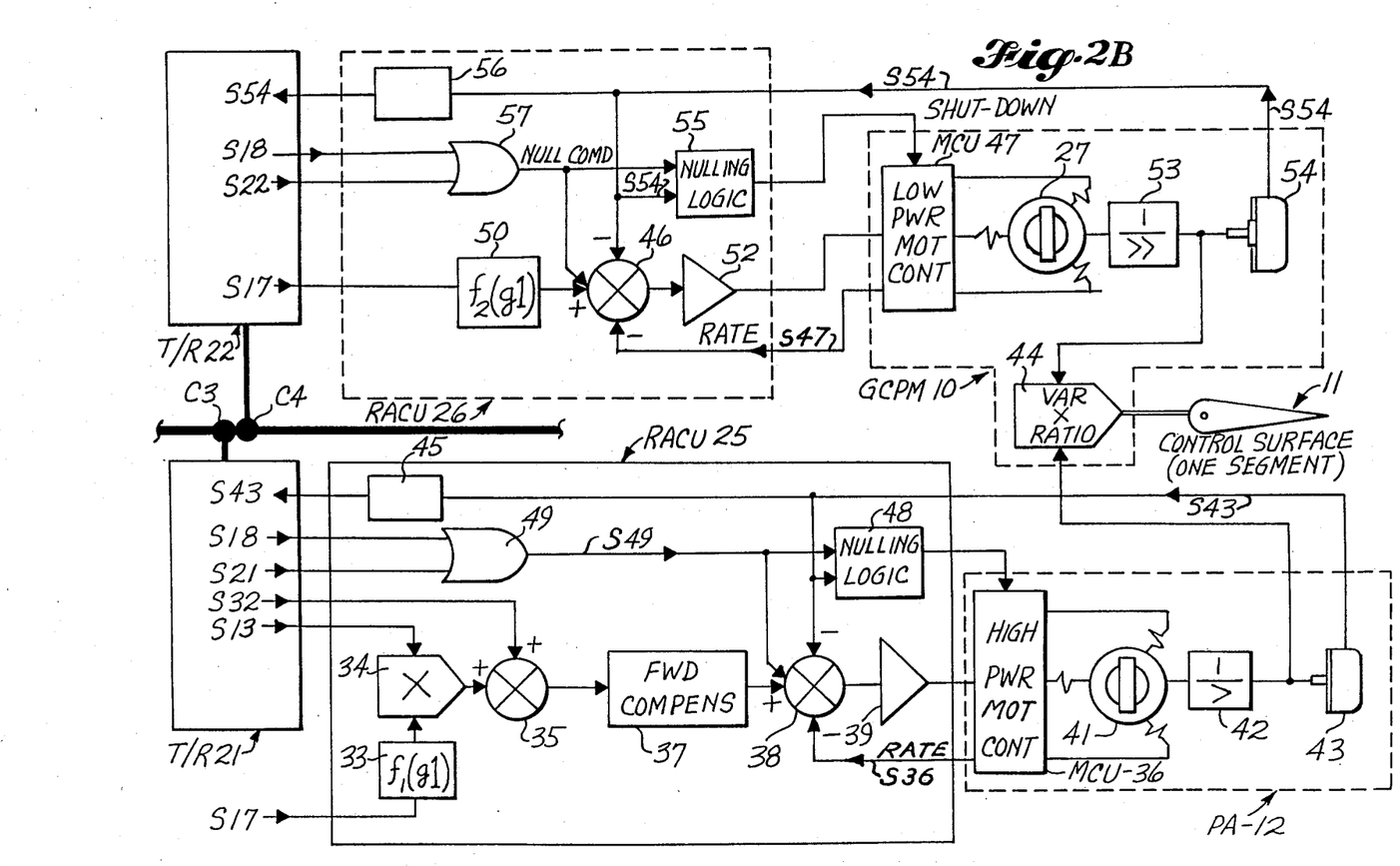

FIGS. 2A and 2B, combined, form a detailed block diagram description of a single channel or a single data bus 16 of the multi-data bus elevator control system shown in FIG. 1, and the single data bus 16 services one control surface segment 11 of a multi-segment elevator control surface. It should be understood that this diagram merely depicts the electronic control circuit and does not include the electrical power system.

In summary, the following description, referring to FIG. 1, data bus 16, follows the electronic signal flow from the pilot's control stick or wrist controller 13, through RACU 15, T/R 19, to data bus 16; from data bus 16, through T/R 21 and RACU 25, to PA 12 with GCPM 10 in its output control path; and from GCPM 10, a feedback signal is sent through RACU 26, T/R 22, to data bus 16; and from data bus 16, the feedback signal is sent through T/R 20, RACU 24, to the pilot's and copilot's redundancy management API 18. Referring to FIGS. 2A and 2B, the pilot's wrist controller 13 contains, amongst other things, a position sensor 14 for the airplane pitch axis; the position sensor 14 sends a signal S13 into a signal conditioning circuit 30 in RACU 15. The signal S13 may be analog to begin with, so the signal conditioning circuit 30 converts the signal S13 to a digital format in order for it to be compatible with T/R 19. As previously stated, the data bus terminal T/R 19 is of the autonomous access type which utilizes DATAC (Digital Autonomous Terminal Access Communication) as described in U.S. Pat. No. 4,199,663 issued Apr. 22, 1980 to H. K. Herzog.

RACU 15 also contains a second signal conditioning circuit 31 which receives an air impact pressure signal S17 from transducer 23 which is connected to pitot static probe 17. The signal S17 may also be analog, so it will have to be converted by the second signal conditioning circuit 31 to a digital format in order for it to be compatible with T/R 19. Both the pilot's input signal S13 and the air impact pressure signal S17 are sent from T/R 21 to RACU 25 which is an electronic control unit for PA 12.

RACU 25 depicts a typical electronic control system for an electro-mechanical actuator, wherein the main control signal inputs are: the pilot's control signal S13; the air impact pressure signal S17; the pilot's nulling discrete signal S18; a data bus lost communication signal S21; and a pitch augmentation signal S32 from a pitch augmentation system (not shown).

In RACU 25, the air impact pressure signal S17 is sent into a function generator 33 which sends a signal to a multiplier 34. Multiplier 34 also receives the pilot's input signal S13 from T/R 21. Both the multiplier 34 and the function generator 33 are inserted in the FIGS. 2A and 2B diagram for the purpose of additionally shaping the pilot's input signal S13 on the basis of the air impact pressure signal S17. The multiplier 34 output signal goes into a summer 35 which also receives a signal S32 from RACU 24.

This particular signal S32 is not originated or transmitted by any unit or station shown in the FIGS. 2A and 2B diagram; and it is included herein for the situation where an augmentation signal from some pitch augmentation system (not shown) would be algebraically added in series, with the pilot's input signal S13, to form the final command signal to MCU (Motor Control Unit) 36 of PA 12.

The summer 35 sends the main command signal to a forward path compensator 37, a summer 38, an amplifier 39, and to MCU 36 of PA 12.

The MCU 36, because of its large power dissipation, is a self-contained unit and is shown in a separate block diagram. The output from MCU 36 is connected to a brushless DC motor 41 that powers PA 12. The motor 41 output shaft drives a gearbox 42 having a jackscrew-driven output rod which connects to both a position sensor 43 and a gain control mechanism 44 of GCPM 10. Position sensor 43 is a rotary transducer having a digital output signal and sends a position feedback signal S43 from PA 12 to both the summer 38 and to a signal conditioner 45. The signal conditioner 45 makes the position feedback signal S43 available to T/R 21 for the purpose of transmitting it onto data bus 16.

In general, hydro-mechanical and electro-mechanical actuators have a certain degree of lag or sluggishness in their performance due to inertia forces involved in the piston or motor and drive mechanism; and to correct this lag response problem, a lead term signal is added to the main command signal from summer 38 within the forward path compensation circuit 37, which lead term signal will cancel out most of the performance lag aspect of PA 12 to produce a more responsive control system. This modified main command signal is then sent from the forward path compensator 37 into summer 38.

Summer 38 receives a position feedback signal S43 from position sensor 43. Motor control unit (MCU) 36 produces a PA 12 rate feedback signal S36, and this rate feedback is used for stabilization, i.e., for augmenting the MCU 36 servo control loop, so that PA 12 is damping stabilized to control position overshoot. For example, if the servo amplifier 39 were to send a step signal input to MCU 36, it may cause PA 12 to overshoot unduly; therefore, by tailoring the rate feedback signal S36 from MCU 36 within the summer 38, the desired dynamic performance characteristics of the MCU 36 loop or the servo control loop, itself, can be achieved.

Further, summer 38 receives two more signals: a pilot's nulling discrete signal S18 from API 18, and a data bus lost cummunication signal S21 from T/R 21; and both signals are related to failure management. If the elevator control system malfunctions, the situation to be avoided is an active failure, wherein the elevator control segment 11 goes hard-over to one side. A passive failure is more acceptable than an active failure; however, in all failure situations, it is necessary to have the capability to bring the control surface segment 11 to a non-deflected or neutral position, and that is one of the major reasons for having the GCPM 10 in the control system. Should the pilot sense the control system malfunction, or see it on API 18, then by pressing a button on API 18, he can transmit signal S18 to de-activate the defective control surface segment; and, as shown in FIG. 1, the de-activation of only one control surface segment is approximately one-fourth of the total surface area of the elevator. The pilot's nulling discrete signal S18 is sent to both PA 12 and GCPM 10 in order to make doubly certain that the control surface segment 11 is positioned at a non-deflected or neutral setting. The pilot's nulling discrete signal S18, which is sent to both PA 12 and GCPM 10, enters summers 38 and 46, respectively, thereof and results in the effective command signal from these summers 38 and 46 being forced to zero. It should be noted that the output from summers 38 and 46 is not to go to zero or to be forced to zero, but that the resulting effective command signal is to be forced to zero which means that each MCU 36 and 47 is effectively trying to crank the control surface segment 11 to the zero deflection or neutral position and then shut their respective drive motors 41 and 27 off so that they will no longer be capable of deflecting the control surface segment 11.

MCU 36 receives a nulling discrete signal from nulling logic circuit 48 which receives a nulling discrete signal from OR gate 49. The OR gate 49 receives two signals from T/R 21: a pilot's null discrete signal S18, and a no-data signal S21. The pilot's null discrete signal S18 is received over the data bus 16 from API 18; and the other signal S21 coming from T/R 21, is a failure signal that indicates that all data has been lost from the data bus 16. Either of these two signals S18 or S21 is capable of forming a nulling discrete signal of null command signal S49 input to nulling logic circuit 48. A signal to de-activate the control surface 11, sent by T/R 21 to OR gate 49, does two things: (1) a nulling discrete signal S49 is sent by OR gate 49 to summer 38 where it forces the resulting effective command signal output of summer 38 to go to zero; and (2) a nulling discrete signal S49 is sent by OR gate 49 to nulling logic circuit 48 where it functions to arm this circuit in such a manner that, after a zero deflection position of the control surface 11 has been reached, a signal will be sent to MCU 36 which will cause PA 12 to become de-powered. MCU 36 will also de-power PA 12 if a rate feedback signal S36 from MCU 36 indicates to the nulling logic circuit 48 that PA 12 is not moving the control surface 11 in the desired direction, i.e., toward a zero deflection position.

API 18 is a redundancy management and performance indicator control and display unit and enables the pilot to make a judgment concerning the proper operation of PA 12 and GAAM 27. Some of API's 18 many functions is to indicate the following: the pilot's elevator control input channel; the actual position of the control surface segment of that channel; and the position or gain value of the GAAM 27. API 18 is also an interactive control unit, i.e., if, in the pilot's judgment, the operation of PA 12 or GAAM 27 is not satisfactory, he can then push a button that is indicated to him on API 18, and this will result in a signal S18 being sent to RACU 24, T/R 20, and on to data bus 16.

Referring to GCPM 10 and its control circuit, which is somewhat similar to that of PA 12, for the normal operating control procedure of GCPM 10, a gain control command signal is received from an airplane indicated airspeed device or, as illustrated, a pitot static probe 17 which, through an air data transducer 23, sends an air impact pressure signal S17 to RACU 15. Within RACU 15, the signal S17 enters a signal conditioner circuit 31 and the output thereof goes through T/R 19 and onto data bus 16. From the data bus 16, the signal S17 is received by T/R 22 and sent thereby to RACU 26, where it enters function generator 50. The function generator 50 output is a function of the air impact pressure signal S17 and constitutes the gain control command signal which is fed to summer 46 and on to servo amplifier 52. The servo amplifier 52 output signal enters MCU 47 which is connected to a relatively low power motor 27 driving a gearbox 53 having a large gear ratio. The gearbox 53 output displacement is sensed by position sensor 54 which sends a feedback signal S54 to the following: summer 46; nulling logic circuit 55; and signal conditioner 56. The output of signal conditioning circuit 56 is connected to T/R 22 for transmission onto data bus 16.

From API 18, a pilot's nulling discrete signal S18 is sent to T/R 22 which also receives a signal S22 indicating loss of communication with the data bus 16. These two signals S18 and S22 are sent by T/R 22 to RACU 26 there they enter OR gate 57. The output signal from OR gate 57 is sent to both the summer 46 and to a nulling logic circuit 55 for action similar to that described with respect to RACU 25.

For an operating description of GCPM 10 and displacement of control surface segment 11, it is first assumed that the indicated airspeed of the airplane or the pitot static probe impact pressure signal S17 commands the gain output of the GCPM 10. Further, it is assumed that the range of gain output is greater than "zero" and less than "one", and wherein, a gain of "one" is assumed to be the maximum set gain increase and a gain of "zero" is a non-deflected or neutral position of the control surface segment 11.

During slow speed flight of the airplane or at low impact pressure signals S17, the gain output value is "one", which means that the control surface segment 11 may angularly be rotated through an angle of approximately 30° either side of the neutral position by PA 12; and during high speed flight operation, the gain value may be as low as "0.2". However, in the event of a failure in the system where the data bus communication has been lost or the pilot has initiated a nulling discrete signal S18, the gain output value is commanded to the "zero" setting.

Assuming that the airplane is being flown in the slow mode such as during a climb-out after take-off, then the gain output value is at its maximum setting of "one"; and if a failure occurs in the elevator control system, the pilot will most likely sense the effect on the aircraft of an inappropriate elevator control surface segment deflection, or he may sense that the elevator control input is not right. Whereupon, he would glance at the API 18 to determine the problem; and with the indicated malfunction, the pilot would push the appropriate button on API 18 to issue a nulling discrete signal S18 for de-activating one of the elevator control surface segments 11-11C to a zero deflection position. This API output signal S18 is received by the electronic control circuits of both the PA 12 and the GCPM 10; and both units are now commanded to position the control surface segment 11 to a zero deflection or neutral control position. Regardless of whether PA 12 or the GCPM 10 is at fault, the control surface segment 11 will be actuated to a neutral position; e.g. assuming that the PA 12 is at fault and that a false feedback signal S43 has caused a hard-over deflection of the control surface segment 11, immediately the electronic control circuit for GCPM 10 will start setting the gain value to "zero" regardless of the deflected position of control surface segment 11, and this will result in segment 11 being moved to a neutral or non-deflected position. However, if the GCPM 10 is at fault, then by definition of this fault, the PA 12 is still operable and, having received the nulling discrete signal S18, will move control surface segment 11 to a neutral position and then de-power or de-activate itself.

Another category of failures relates to the loss of signal communication through the data bus 16; and, as stated previously, if signal communication on the data bus 16 is lost, and this is the failure that is occurring, then the T/R units 21 and 22 are still both operable because the power circuit (not shown) is still functioning. Therefore, T/R units 21 and 22 will be capable of putting out the nulling discrete signal S18; and both PA 12 and GCPM 10 will function to position the control surface segment 11 to a neutral position.

Of course, other types of failures can occur, e.g., a failure could be associated with RACU 15 or RACU 24, or with the control stick 13, or one of the other components may be involved; however, in most of these types of failures, the ultimate result will be a neutral positioning of the defective control surface element 11. The result of such re-configuration will produce a reduction in the total elevator control surface activated; but, in no reasonably foreseeable failure event would the consequence be a complete loss of elevator control response.

Figure 3:
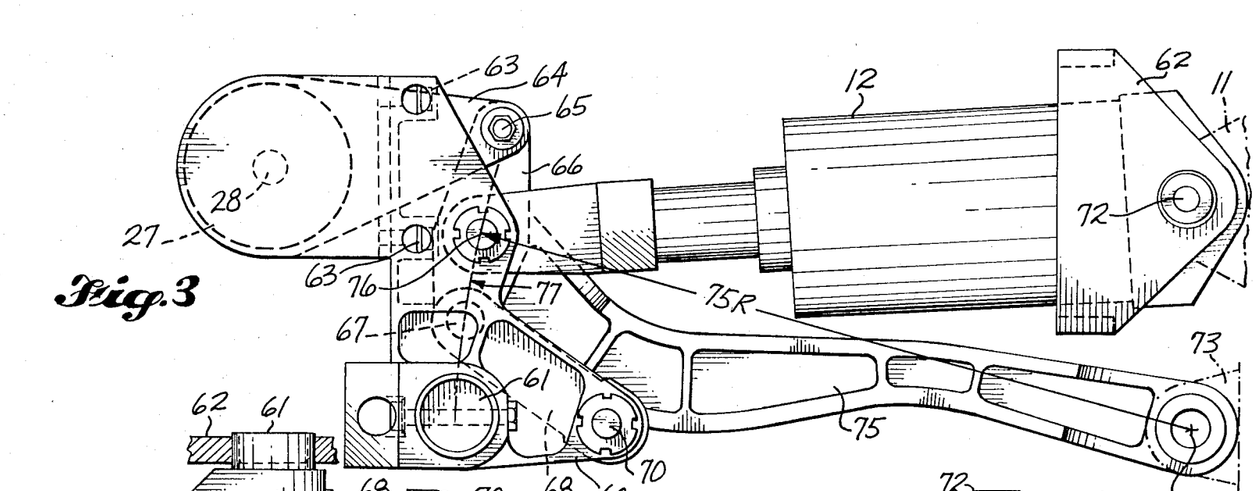
FIG. 3 is an enlarged detail view of a GCPM (Gain Control Power Module) depicted in FIG. 1 and shows the GCPM arranged at its maximum gain position.

FIG. 3 is an enlarged detail view of a GCPM 10-10C depicted in FIG. 1 and shows the GCPM arranged at its maximum gain position or low airspeed condition such as for the landing or take-off of an airplane.

A bellcrank body 60 is fixedly pivoted at 61 to airplane structure 62. An upper arm of bellcrank body 60 is fixedly fastened through nuts and bolts 63 to the housing of GAAM (Gain Authority Adjust Motor) 27. The linear power actuator 12 has its housing connected pivotally at 72 to fixed structural support and has its piston rod end connected at pivot 71 to bellcrank body 60 for rotatable actuation thereof about its fixed point 61. The GAAM 27 has a drive shaft 28 connected to a drive arm 64 which forms a first link of a four-bar linkage mechanism. The swinging end of drive arm 64 is pivotally connected at 65 to one end of a middle link 66 which forms a second link of the four-bar linkage mechanism. The other end of middle link 66 is pivotally connected at 67 to one end of a link 68 which forms a third link of the four-bar linkage mechanism. The other end of link 68 is pivotally connected at 70 to the lower arm of bellcrank body 60. A fourth link of the four-bar linkage mechanism is formed by an imaginary link integral with the bellcrank body 60 and extends between pivot point 70 and drive shaft 28.

Elevator control surface segment 11 is pivotally connected along a hinge axis 72 to horizontal stabilizer structure; and an elevator control arm 73 is pivotally connected at 74 to one end of an S-link 75. The other end of S-link 75 is pivotally connected at 76 to middle link 66. Pivot point 76 on middle link 66, through the kinematics of the four-bar linkage, approximately simulates an arc 77 produced by a radial 75R having its center at pivot 74. The path of arc 77R passes directly over the structurally fixed pivot point 61 of the bellcrank body 60. The radial arc 77 is not exact, geometrically, but it is close enough so that there is no significant control input to the elevator control surface segment 11 during a gain change of the GCPM 10. This is an important aspect of the GCPM 10, because it is necessary to maintain the same pilot/copilot primary control input to the elevator control surface segment 11 without introducing a secondary control input through the kinematic motion of the four-bar linkage. The fourbar linkage essentially functions as a variable length arm of bellcrank body 60 to position pivotal attach points 76 of S-link 75, relative to the pivotal axis 61 of the bellcrank body 60, for adjusting the maximum angle-of-deflection range of the elevator control surface segment 11. For one known airplane installation, the maximum arc-of-travel of an elevator control surface, at slow landing or take-off airspeeds, is approximately plus-or-minus 30 degrees. As the airspeed of the airplane increases from the landing or take-off airspeeds, the aerodynamic forces produced by the angular deflection of a control surface segment also increases; and a lesser arc-of-travel range of the control surface segment is required for control of airplane attitude.

Figure 4:
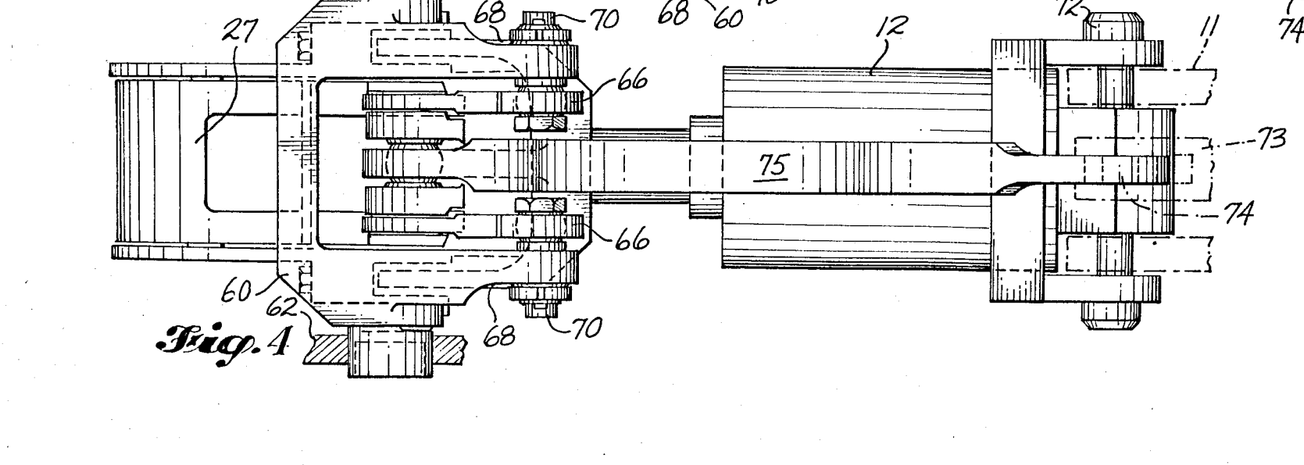
FIG. 4 is a bottom plan view of FIG. 3.

FIG. 4 is a bottom plan view of FIG. 3.

Figure 5:
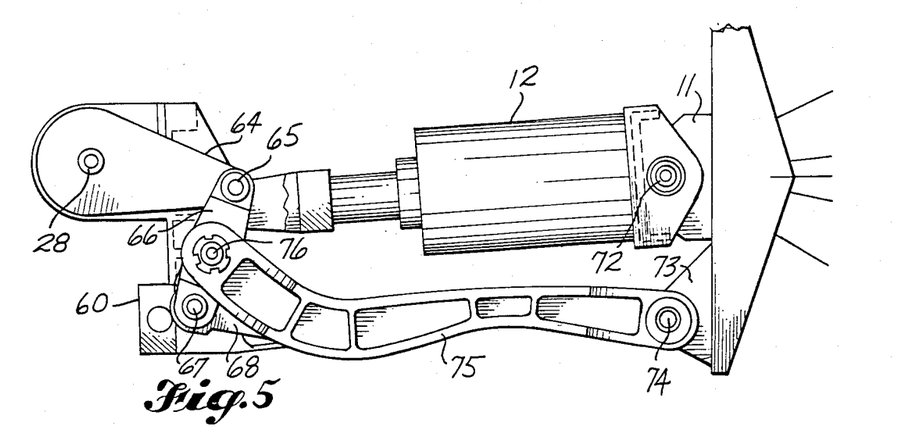
FIGS. 5, 6 and 7 are reduced in size views of a GCPM similar to that shown in FIG. 3 and show a GCPM at various operating positions.

FIG. 5 shows the GCPM at a mid-q-position or medium cruise flight speed condition. The q-signal also increases with increasing airspeed; and, through the electronic system shown in FIGS. 1 and 2, GAAM 27 will be operated in conjunction therewith. The GAAM 27 moves the four-bar linkage mechanism causing point 76 to move along simulated arc 77, with link 75 acting as the radial arm 75R. The link 75 is depicted as S-shaped for operating clearance purposes. It may be necessary for some installations of the GCPMs into existing airplane structures to alter the shape of some or all of the linkages because of interference problems and to provide adequate operating clearance therefor. However, the geometry of the linkage should be made to function such that the arc-of-travel of the control surface 11 relative to the stroke length of PA 12 is changed; e.g., as the q-signal increases with increasing airspeed, a relatively smaller angle-of-deflection of the control surface 11 should be produced without changing the overall stroke length of PA 12. This is accomplished by GAAM 27 rotating crank arm 64 to reposition attach point 76 relative to the fixed pivotal axis 61 of bellcrank body 60. The actual stroke length of PA 12 is not changed. However, through electronic circuitry control of GAAM 27, the effective output stroke length of PA 12 is varied. With the GAAM 27 set at the half-gain position shown in FIG. 5, there is no possible way that the PA 12 can move the control surface segment 11 through an angle-of-deflection of more than half-range. This authority limitation of PA 12 is an important aspect of the present invention.

Figure 6:
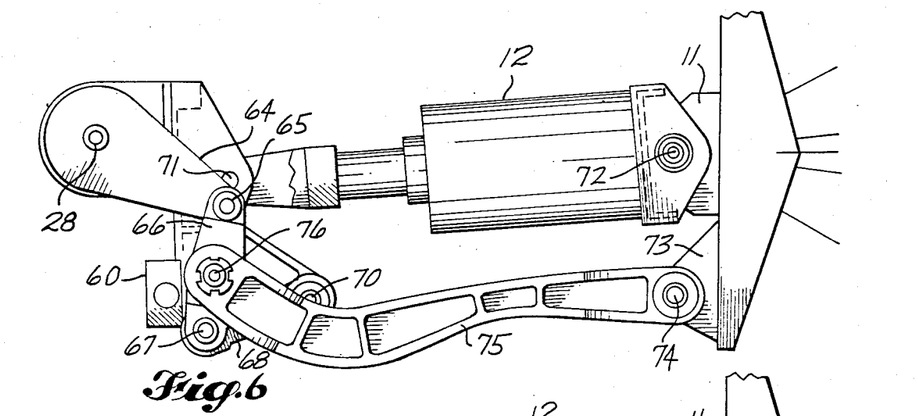

FIG. 6 shows the GCPM at a high-q-position or at a high airspeed condition such as for maximum cruise flight operation of an airplane. The GAAM 27 rotates crank arm 64 to reposition pivot 76, along simulated arc 77, relative to the bellcrank body fixed pivot 61, so that there is a predetermined minimum arc-of-travel of the control surface segment 11 relative to the stroke length of PA 12. For one airplane installation, the minimum arc-of-travel of the control surface is approximately plus-or-minus 10 degrees. The actual full stroke length of PA 12 is not changed; however, through electronic circuitry control of GAAM 27, the output authority of PA 12 is changed so that a relatively smaller angle-of-deflection of the control surface segment 11 is produced by a full stroke of PA 12.

Figure 7:
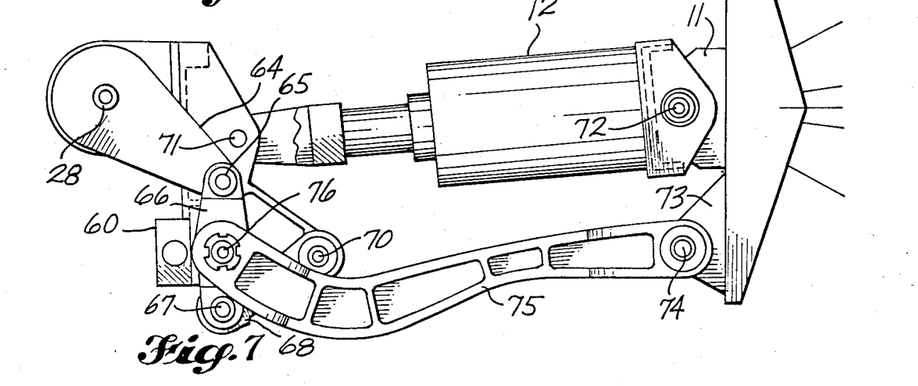

FIG. 7 shows the GCPM at a zero gain position. The GAAM 27 re-arranges the four-bar linkage mechanism such that axis of pivot 76 is moved along simulated arc 77 to a vertically aligned position with the axis of bellcrank fixed pivot 61. Then the kinematic movement of the four-bar linkage is such that the control surface segment 11 is moved to a neutral or non-deflected position and there is no further movement of the control surface segment 11 by the operation of PA 12; i.e., the effect of PA 12 on the control surface 11 is completely passivated. This zero gain position can be activated by the pilot or copilot through API 18 or through the failure mode of the electronic control circuit, as previously described.

Figure 8:
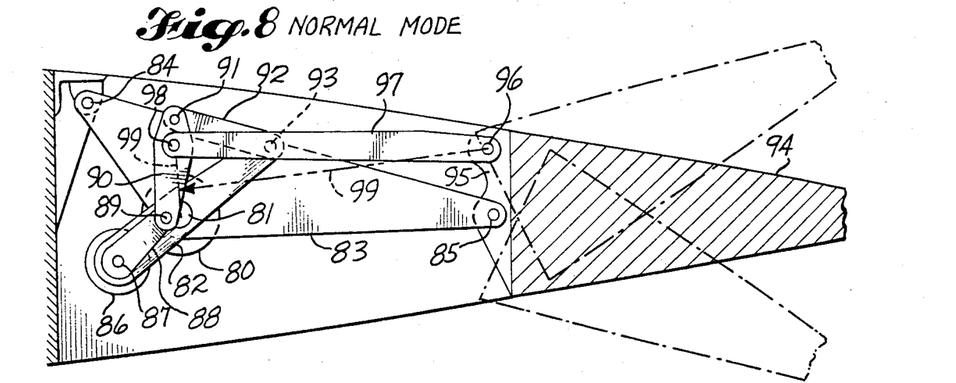
FIGS. 8, 9 and 10 show a second embodiment of a GCPM having a rotary power actuator instead of the linear power actuator shown in the previous figures, and show a GCPM at various operating positions.
Figure 9:
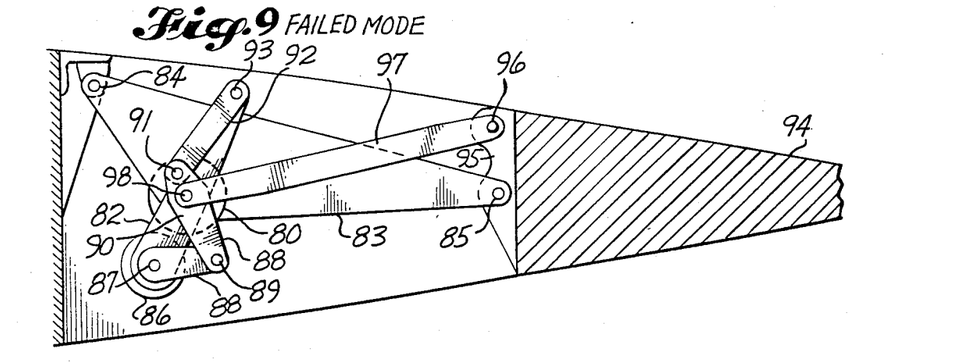
Figure 10:
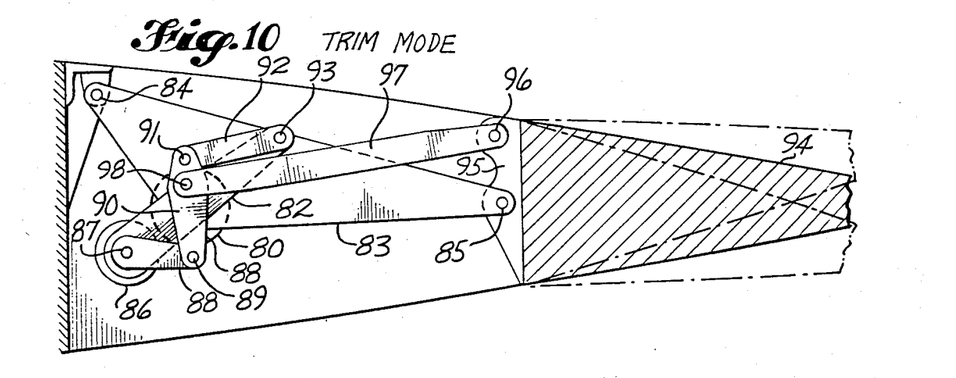

FIGS. 8 to 10 illustrate a second embodiment of a GCPM (Gain Control Power Module) somewhat similar to that previously shown, with the exception that a rotary PA 80 is used instead of the linear PA 12-12C shown in FIGS. 1 to 7.

FIG. 8 depicts the GCPM at a normal mode of operation with a gain setting of "one"; FIG. 10 depicts the GCPM at a trim-mode of operation, whereat the actuator/surface displacement ratio has been varied by a mid-gain setting; and FIG. 9 depicts the GCPM at a gain setting of "zero", whereat a hard-over signal or actuator failure is passivated by an actuator/surface displacement ratio of zero.

Referring to FIGS. 8 to 10, a main power actuator unit or rotary PA 80 has its housing fixedly mounted to a structural support beam 83 which is fastened at 84 and 85 to fixed structure. Rotary PA 80 has a drive shaft 81 connected to an elongated drive arm 82 at approximately mid-length thereof. GAAM (Gain Authority Adjust Motor) 86 has its housing fixedly mounted to one end of the elongated drive arm 82. The GAAM 86 has a drive shaft 87 connected to a crank arm 88 which forms a first link of a four-bar linkage. The swinging end of crank arm 88 is pivotally connected at 89 to one end of a middle link 90 which forms a second link of the four-bar linkage. The other end of middle link 90 is pivotally connected at 91 to one end of a link 92 which forms a third link of the four-bar linkage. The other end of link 92 is pivotally connected at 93 to the other end of elongated drive arm 82. A fourth link of the four-bar linkage is formed by the elongated drive arm 82 and extends between pivot point 93 and drive shaft 87 of GAAM 86.

Elevator control surface segment 94 is pivotally connected along a hinge axis 85 to horizonal stabilizer structure 83; and an elevator control arm 95 is pivotally connected at 96 to one end of control rod 97. The other end of control rod 97 is pivotally connected at 98 on middle link 90. Pivot point 98 on middle link 90, through the kinematics of the four-bar linkage, approximately simulates an arc 99 produced by a radial 99R having its center at pivot 96. The path of arc 99 passes directly over the axis of the drive shaft 81 of rotary PA 80. The radial arc 99 is not exact, geometrically, but it is close enough so that there is no significant control input to the elevator control surface segment 94 during a gain change of the GCPM. The four-bar linkage functions to position pivotal attach point 98, of control rod 97, relative to the pivotal axis 81 of the elongated drive arm 82 for adjusting the maximum angle-of-deflection range of the elevator control surface segment 94.

As previously stated, in the design of an all-electric flight control system for an airplane, there is a real problem in providing an electro-hydraulic or electromechanical power actuator means for a primary control surface that will provide both adequate power and adequate bandwidth insofar as response characteristics of the control surface is concerned. However, by inserting the GCPM (Gain Control Power Module) of the present invention directly into the control load path of a primary control surface, the bandwidth problem is solved. Because of high airspeed when large hinge moments are required and there is only a small angle-of-deflection range to accommodate, the GCPM can be set at a low-gain position. The PA is still operated over its full stroke, but because of a change in the mechanical ratio output of the GCPM, through the kinematics of a four-bar linkage mechanism, there is an increase in the force of the control stroke output with an accompanying decrease in the length of control stroke from the GCPM. The PA is unaware of an increase in hinge moment due to the higher airspeed and greater aerodynamic impact pressure acting on the deflected control surface; therefore, in this situation, the GCPM functions as an impedance matching device. At slow airspeed, where the aerodyamic loads acting on the control surface are fairly low and a maximum angle-of-deflection range of control surface movement is required, the GCPM is set at a high-gain position in order to accomplish this. Therefore, the GCPM functions as a load impedance matching device and permits the use of a much smaller size PA than in the present known approach of designing for the maximum hinge moments encountered for both moving the control surface through its maximum angle-of-deflection range and at its predetermined maximum rate.

We claim:

1. An avionic control system for aircraft, comprising: a flight control surface divided into multi-control segments and each control segment being independently mounted for angular motion about a hinge axis; and actuator separately connected to each individual control segment for angular movement thereof; a manually operable controller for generating a first signal related to direction and magnitude of displacement of said controller; means for tansmitting said first signal to each of said actuators for controlling angular movement of their respective control segment; a gain control power module separately interposed into the main load path between each actuator and its respective control segments means responsive to flight Mach number of the air craft for providing a second signal; means for transmitting said second signal to each of said gain control power modules for decreasing the angular displacement range of each respective control segment relative to its actuator movement as the Mach number of the aircraft increases; and means for transmitting a nulling signal to the gain control power module of a malfunctioning control segment for producing a zero angular displacement range of said control segment relative to its actuator movement and moving said control segment to a neutral non-deflected position regardless of its actuator movement.

2. The avionic control system as recited in claim 1, wherein each of said gain control power modules comprises: a support frame lever mounted to aircraft structure for rotation about a fixed axis; a variable length movement arm means mounted on said support frame lever for rotational movement therewith and having its pivotal axis in co-axial alignment with said support frame lever pivot axis; a control segment born mounted to each of said control segments for rotational movement thereof; a drive link pivotally connected at one end to the swinging end of said variable length moment arm means and pivotally connected at the other end to one of said control segment horns; one of said actuators being connected to said support frame lever for movement thereof about said fixed axis; and means for varying the length of said moment arm means to change the ratio between the stroke length of the respective actuator and the angular displacement of the respective control segment.

3. The avionic control system as recited in claim 1, wherein each of said gain control power modules comprises: a frame member mounted to aircraft structure for rotation about a fixed first axis; said respective actuator being connected to said frame member at an effective input moment arm length extending from said first pivot axis for rotational movement thereof; means for providing an effective output moment arm of variable length mounted on said frame member for rotational movement therewith and said output moment arm having its pivotal axis in co-axial alignment with said first pivot axis; a control segment horn fixedly attached to each of said control segments for individual rotational movement thereof; a drive rod pivotally connected at one end to the swinging end of said variable length output moment arm and pivotally connected at the other end to a respective control segment horn; and means for varying the length of said output moment arm to change the ratio between the angular displacement range of each of said control segments relative to the stroke length of their respective actuator.

4. An avionic control system for an aircraft, comprising: a flight control surface divided into multi-control segments and each control segment being independently mounted for angular motion about a hinge axis; an actuator separately connected to each individual control segment for angular movement thereof; a manually operable controller for generating a first signal related to direction and magnitude of displacement of said controller; means for transmitting said first signal to each of said actuators for controlling angular movement of their respective control segment; a gain control power module separately interposed into the main load path between each actuator and its respective control segment; means responsive to flight Mach number of the aircraft for providing a second signal; means for transmitting said second signal to each of said gain control power modules for decreasing the angular displacement range of each respective control segment relative to its actuator movement as the Mach number of the aircraft increases; an actuator performance indicator for visually displaying, in an integrated manner, the actual present position of both the control segments and their respective actuators, and having warning means for alerting a pilot to any discrepancy related to deviations of the control segments and their respective actuators from their respective scheduled positions; said actuator performance indicator including deactivating means for providing a third signal; and means for transmitting said third signal to gain control power module related to a malfunctioning control segment for automatically positioning the malfunctioning control segment to a passive mode and then deactivating the avionics thereto.

* * * * *